United States Patent
Jurkovic et al.

(10) Patent No.: US 10,003,227 B2
(45) Date of Patent: Jun. 19, 2018

(54) AXIALLY ASYMMETRIC CONFIGURATION FOR INTERIOR PERMANENT MAGNET MACHINE

(71) Applicant: GM GLOBAL TECHNOLOGY OPERATIONS LLC, Detroit, MI (US)

(72) Inventors: Sinisa Jurkovic, Sterling Heights, MI (US); Mohammad Faizul Momen, Rochester Hills, MI (US); Khwaja M. Rahman, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 433 days.

(21) Appl. No.: 14/788,946

(22) Filed: Jul. 1, 2015

(65) Prior Publication Data

US 2016/0276885 A1 Sep. 22, 2016

Related U.S. Application Data

(60) Provisional application No. 62/135,909, filed on Mar. 20, 2015.

(51) Int. Cl.
*H02K 1/27* (2006.01)
*H02K 29/03* (2006.01)

(52) U.S. Cl.
CPC .......... *H02K 1/2766* (2013.01); *H02K 29/03* (2013.01); *H02K 2201/06* (2013.01)

(58) Field of Classification Search
CPC ...... H02K 1/2706; H02K 1/2766; H02K 1/27; H02K 29/03; H02K 2201/06; H02K 1/276
USPC ........................................ 310/156.53, 156.56
See application file for complete search history.

(56) References Cited

U.S. PATENT DOCUMENTS

| | | | | |
|---|---|---|---|---|
| 2004/0245880 A1* | 12/2004 | Liang | ..................... | H02K 1/278 310/156.47 |
| 2007/0205689 A1* | 9/2007 | Nemoto | ................. | H02K 29/03 310/12.22 |
| 2007/0228862 A1* | 10/2007 | Welchko | .............. | H02K 1/2766 310/156.53 |
| 2009/0224621 A1* | 9/2009 | Okubo | ................... | H02K 1/278 310/156.25 |
| 2013/0270952 A1* | 10/2013 | Jurkovic | .............. | H02K 1/2766 310/156.01 |

FOREIGN PATENT DOCUMENTS

| | | |
|---|---|---|
| CN | 103986295 A | 8/2014 |
| CN | 103988399 A | 8/2014 |
| DE | 102005017481 A1 | 10/2006 |
| DE | 102010043224 A1 | 5/2012 |

* cited by examiner

*Primary Examiner* — Naishadh Desai
(74) *Attorney, Agent, or Firm* — Quinn IP Law

(57) ABSTRACT

An interior permanent magnet machine includes a rotor having a central axis and a plurality of axial segments. The axial segments include a first axial segment and a second axial segment positioned adjacent to each other in an axial direction. Each of the axially-spaced segments includes at least one pole defining a respective angular configuration characterized by respective first, second and third angles. The first axial segment defines a first set of angular configurations and the second axial segment defines a second set of angular configurations. The rotor is configured to have an axially asymmetric configuration such that the first set of angular configurations is different from the second set of angular configurations.

13 Claims, 3 Drawing Sheets

AXIALLY ASYMMETRIC CONFIGURATION FOR INTERIOR PERMANENT MAGNET MACHINE

CROSS-REFERENCE TO RELATED APPLICATIONS

This application claims the benefit of U.S. Provisional Application No. 62/135,909, filed Mar. 20, 2015, which is hereby incorporated by reference in its entirety.

TECHNICAL FIELD

The present invention relates generally to an interior permanent magnet machine, and more particularly, to the configuration of rotor slots in the interior permanent magnet machine.

BACKGROUND

An interior permanent magnet machine generally includes a rotor having a plurality of magnets of alternating polarity buried inside the rotor. The rotor is rotatable within a stator which generally includes a plurality of windings. Permanent magnet machines may produce radial forces on the stator teeth, resulting in unwanted vibration and noise.

SUMMARY

An interior permanent magnet machine includes a rotor having a central axis and a plurality of axial segments. The axial segments include a first axial segment and a second axial segment positioned adjacent to each other in an axial direction. Each of the axially-spaced segments includes at least one pole defining a respective angular configuration characterized by respective first, second and third angles. The first axial segment defines a first set of angular configurations and the second axial segment defines a second set of angular configurations. The rotor is configured to have an axially asymmetric configuration such that the first set of angular configurations is different from the second set of angular configurations.

The at least one pole includes a pole axis extending from the central axis mid-way through the at least one pole and a first pair of slots configured to be symmetric about the pole axis and arranged in a radially-inner first layer. The first angle is defined between the pole axis and a first centerline of one of the first pair of slots. A second pair of slots is configured to be symmetric about the pole axis and arranged in a radially-outer second layer. The second angle is defined between the pole axis and a second centerline of one of the second pair of slots. A pair of outer slots is configured to be symmetric about the pole axis and formed near an outer surface of the rotor. The third angle is defined between the pole axis and a third centerline of one of the pair of outer slots.

In a first embodiment, the first axial segment includes a first pole (A) directly adjacent to a second pole (B) and the second axial segment includes a third pole (C) directly adjacent to a fourth pole (D). Each of the first, second, third and fourth poles (A, B, C, D) defines respective first, second, third and fourth angular configurations [($A_1$, $A_2$, $A_3$), ($B_1$, $B_2$, $B_3$), ($C_1$, $C_2$, $C_3$), ($D_1$, $D_2$, $D_3$)] represented by respective first, second and third angles. Adjacent ones of the plurality of axial segments may be alternately flipped around the axial direction. The first angular configuration ($A_1$, $A_2$, $A_3$) and the fourth angular configuration ($D_1$, $D_2$, $D_3$) are the same. The second angular configuration ($B_1$, $B_2$, $B_3$) and the third angular configuration ($C_1$, $C_2$, $C_3$) are the same. The first axial segment exhibits pole-to-pole asymmetry such that the first angular configuration ($A_1$, $A_2$, $A_3$) is different from the second angular configuration ($B_1$, $B_2$, $B_3$). The second axial segment exhibits pole-to-pole asymmetry such that the third angular configuration ($C_1$, $C_2$, $C_3$) is different from the fourth angular configuration ($D_1$, $D_2$, $D_3$). It is the combination of these features that allows reduction in both torque ripple and pole-pass order radial force.

The first angular configuration ($A_1$, $A_2$, $A_3$) may be different from the second angular configuration ($B_1$, $B_2$, $B_3$), when a difference between at least one of the respective first, second and third angles in the first angular configuration, relative to the second angular configuration, is at or above a threshold. The first angular configuration ($A_1$, $A_2$, $A_3$) may be different from the second angular configuration ($B_1$, $B_2$, $B_3$), when a a respective difference between at least two of the respective first, second and third angles in the first angular configuration, relative to the second angular configuration, is at or above a threshold. The first angular configuration ($A_1$, $A_2$, $A_3$) may be different from the second angular configuration ($B_1$, $B_2$, $B_3$), when a respective difference between each of the respective first, second and third angles in the first angular configuration, relative to the second angular configuration, is at or above a threshold.

In a second embodiment, the first axial segment includes a first pole (E) directly adjacent to a second pole (F) and second axial segment includes a third pole (G) directly adjacent to a fourth pole (H). Each of the first, second, third and fourth poles (E, F, G, H) defines respective first, second, third and fourth angular configurations [($E_1$, $E_2$, $E_3$), ($F_1$, $F_2$, $F_3$), ($G_1$, $G_2$, $G_3$), ($H_1$, $H_2$, $H_3$)] represented by respective first, second and third angles. The first axial segment exhibits pole-to-pole symmetry such that the first angular configuration ($E_1$, $E_2$, $E_3$) and the second angular configuration ($F_1$, $F_2$, $F_3$) are the same. The second axial segment exhibits pole-to-pole symmetry such that the third angular configuration ($G_1$, $G_2$, $G_3$) and the fourth angular configuration ($H_1$, $H_2$, $H_3$) are the same. The first and second axial rotor segments define different sets of angular configurations such that: the first angular configuration ($E_1$, $E_2$, $E_3$) is different from each of the third angular configuration ($G_1$, $G_2$, $G_3$) and the fourth angular configuration ($H_1$, $H_2$, $H_3$); and the second angular configuration ($F_1$, $F_2$, $F_3$) is different from each of the third angular configuration ($G_1$, $G_2$, $G_3$) and the fourth angular configuration ($H_1$, $H_2$, $H_3$). It is the combination of these features that allows reduction in both torque ripple and pole-pass order radial force.

The first angular configuration ($E_1$, $E_2$, $E_3$) may be different from the third angular configuration ($G_1$, $G_2$, $G_3$) when a difference between at least one of the respective first, second and third angles in the first angular configuration, relative to the third angular configuration, is at or above a threshold. The first angular configuration ($E_1$, $E_2$, $E_3$) may be different from third angular configuration ($G_1$, $G_2$, $G_3$) when a respective difference between at least two of the respective first, second and third angles in the first angular configuration, relative to the third angular configuration, is at or above a threshold. The first angular configuration ($E_1$, $E_2$, $E_3$) may be different from the third angular configuration ($G_1$, $G_2$, $G_3$) when a respective difference between each of the respective first, second and third angles in the first angular configuration, relative to the third angular configuration, is at or above a threshold.

The above features and advantages and other features and advantages of the present disclosure are readily apparent

DETAILED DESCRIPTION

Figure 1:
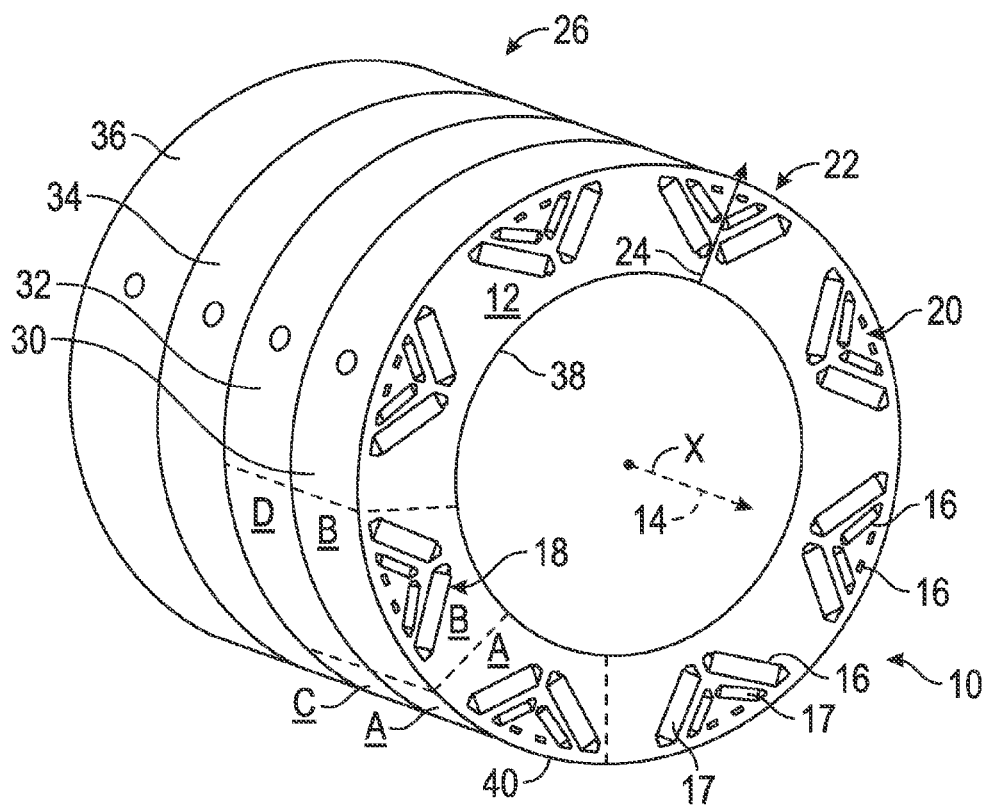
FIG. 1 is a schematic fragmentary perspective view of an interior permanent magnet machine showing a rotor with a plurality of axially-spaced segments, including first and second axial segments.
Figure 2:
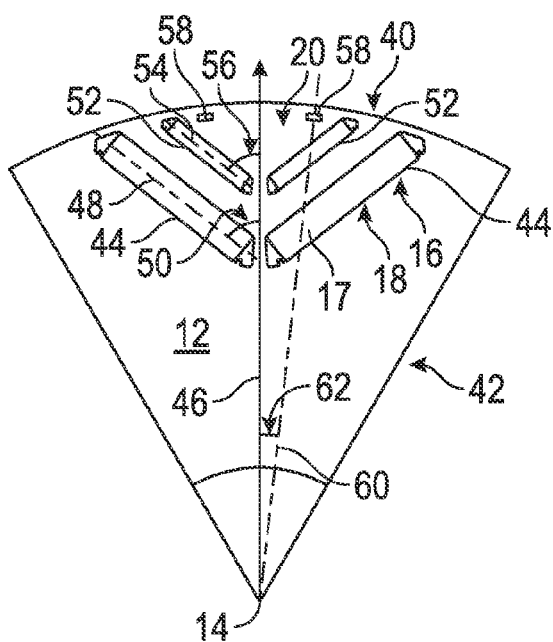
FIG. 2 is a schematic cross-sectional view of a portion of FIG. 1.

Referring to the Figures, wherein like reference numbers refer to the same or similar components throughout the several views, FIG. 1 is a schematic perspective view of an interior permanent magnet machine 10 having a rotor 12 arranged around a central axis 14. The rotor 12 is rotatable within a generally annular stator (not shown). FIG. 2 is a schematic cross-sectional view of a portion of FIG. 1. Referring to FIGS. 1-2, the rotor 12 is formed with a plurality of slots 16 that extend into the rotor 12 and define a three-dimensional volume having any suitable shape. All or a portion of the slots 16 may be filled with permanent magnets 17. The slots 16 may be arranged in a radially-inner first layer 18 and a radially-outer second layer 20.

Referring to FIG. 1, the rotor 12 includes a plurality of poles 22, each having respective pole axes 24 extending from the central axis 14 and half-way or mid-way through the respective poles. The rotor 12 may be formed with any number of poles or slots. In one example, the rotor 12 is formed with 8 poles and 72 stator slots. In another example, the rotor 12 is formed with 10 poles.

Referring to FIG. 1, the rotor 12 includes a plurality of axial segments 26 oriented axially or axially-spaced around the central axis 14. The axial direction X is parallel to the central axis 14. The axial segments 26 may be stacked together during final assembly. For illustrative purposes, the rotor 12 is shown with first, second, third and fourth axial segments 30, 32, 34 and 36; however any number of axial segments may be used.

As shown in FIG. 1, the axial segments 30, 32, 34 and 36 are shaped in the form of an annulus or ring with an inner surface 38 and outer surface 40. The second axial segment 32 is directly adjacent axially to the first axial segment 30 on one side and the third axial segment 34 on the other side. The third axial segment 34 is directly adjacent axially to the second axial segment 32 on one side and the fourth axial segment 36 on the other side.

Referring to FIG. 2, a representative pole 42 is shown. Each pole 42 includes a first pair of slots 44 that are symmetric about the pole axis 46, and arranged in the radially-inner first layer 18. Each of the first pair of slots 44 defines a respective centerline. Referring to FIG. 2, a first angle 50 is defined between a first centerline 48 passing through the center of one of the first pair of slots 44 (either one, since they are symmetric relative to pole axis 46) and the pole axis 46. Each pole 42 includes a second pair of slots 52 that are symmetric about the pole axis 46, and arranged in the radially-outer second layer 20. Each of the second pair of slots 52 defines a respective centerline. Referring to FIG. 2, a second angle 56 is defined between a second centerline 54 through the center of one of the second pair of slots 52 (either one, since they are symmetric relative to the pole axis 46) and the pole axis 46.

Each pole 42 includes a pair of outer slots 58 formed near the outer surface of the rotor 12. A third centerline 60 passes through the center of one (either one, since they are symmetric relative to the pole axis 46) of the pair of outer slots 58, extending from the central axis 14. A third angle 62 is defined between the third centerline 60 and the pole axis 46. The set (50, 56, 62) of the first, second and third angles 50, 56, 62 characterizes or defines the slot configuration or "angular configuration" of each pole 42.

The rotor 12 is configured to have an axially asymmetric configuration, such that directly adjacent axial segments, such as first and second axial segments 30, 32, define different sets of angular configurations. The axially asymmetric configurations are described with respect to two embodiments: a first embodiment shown in FIGS. 3-4 and a second embodiment shown in FIGS. 5-6. The first axial segment 30 (130 in the second embodiment) defines a first set of angular configurations 31 (131) and the second axial segment 32 (132) defines a second set of angular configurations 33 (133). The rotor 12 is configured to have an axially asymmetric configuration such that the first set of angular configurations 31 (131) is different from the second set of angular configurations 33 (133), as described below.

The axially asymmetric configurations help to reduce radial forces produced by the machine 10 and transmitted through the stator teeth (not shown), resulting in unwanted noise in the transmission case (not shown). The noise frequencies may be characterized by pole and non pole-pass orders. The pole pass orders are the number of poles in the rotor 12 and its integer multiples. For example, an 8 pole machine has pole pass orders of 8, 16, 24, 32, 40, etc. The tooth forces may be calculated using, for example, the Maxwell Stress Tensor method. Once the tooth forces are calculated, different orders may be calculated after performing Fast Fourier Transform (FFT). FFT extracts the magnitude and phases of each of the orders.

First Embodiment

Figure 3:
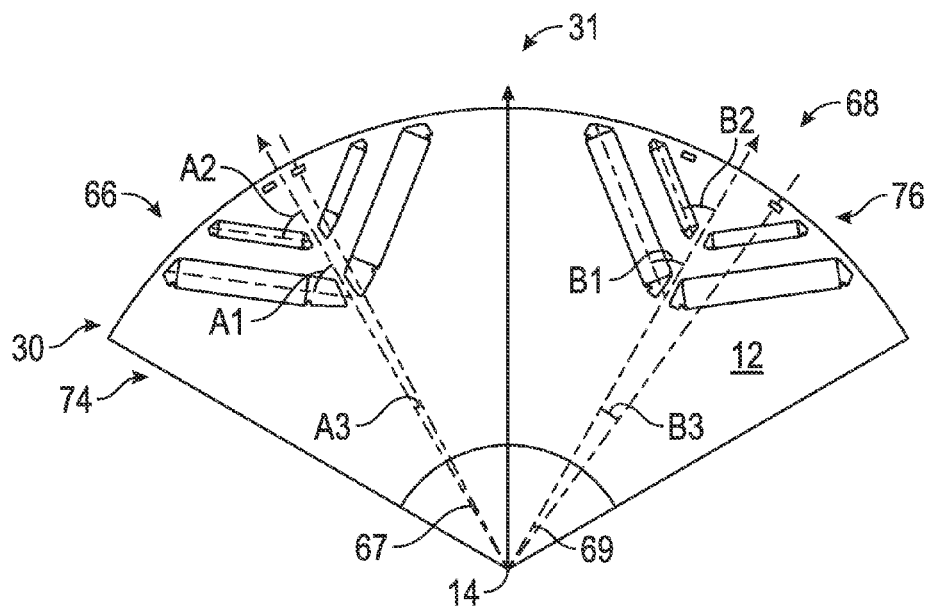
FIG. 3 is a schematic fragmentary cross-sectional view of the first axial segment, in accordance with a first embodiment.
Figure 4:
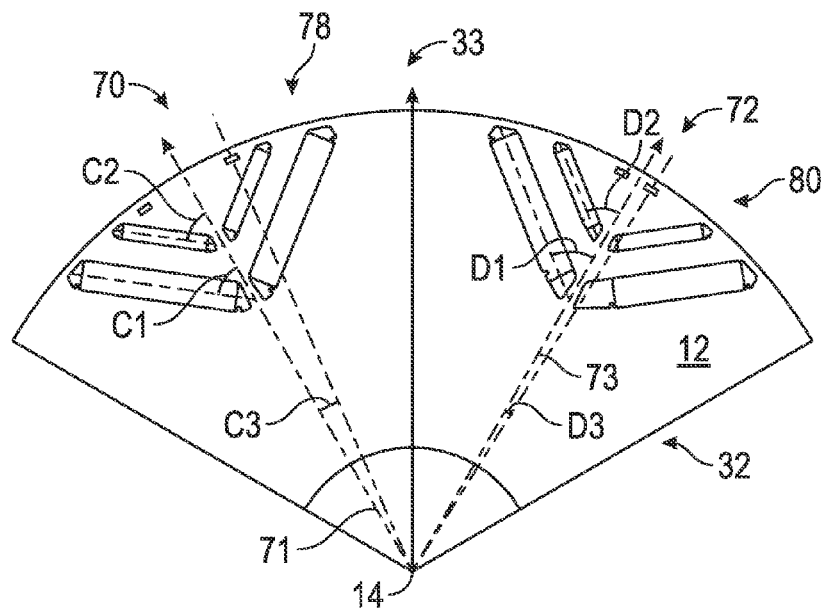
FIG. 4 is a schematic fragmentary cross-sectional view of the second axial segment, in accordance with the first embodiment.

In the first embodiment, referring to FIG. 3, the first axial segment 30 includes a first pole 66 (A) directly adjacent to a second pole 68 (B). Each of the first, second, third and fourth poles 66, 68, 70, 72 defines respective first, second, third and fourth pole axes 67, 69, 71, 73, extending from the central axis 14 and half-way or mid-way through the respective poles. Referring to FIG. 4, the second axial segment 32 includes a third pole 70 (C) directly adjacent to a fourth pole 72 (D). Each of the first, second, third and fourth poles 66, 68, 70, 72 defines respective first, second, third and fourth angular configurations 74, 76, 78, 80 [($A_1$, $A_2$, $A_3$), ($B_1$, $B_2$, $B_3$), ($C_1$, $C_2$, $C_3$), ($D_1$, $D_2$, $D_3$)] represented by the respective first, second and third angles 50, 56, 62 that are described with reference to FIG. 2. The pattern shown by the first and second poles 66 (A), 68 (B) may be repeated for the rest (not shown) of the first axial segment 30. The pattern shown by the third and fourth poles 70 (C), 72 (D) may be repeated for the rest (not shown) of the second axial segment 32. While a two-pole pattern is shown in this embodiment, a three-pole or four-pole pattern may also be employed. The first axial segment 30 defines the first set of angular configurations 31 and the second axial segment 32 defines the second set of angular configuration 33. The rotor 12 is configured to have an axially asymmetric configuration such that the first set of angular configurations 31 is different from the second set of angular configurations 33, as described below. The first set of angular configurations 31 may be different from the second set of angular configurations 33 if any of the angular configurations in the first set vary from the second set.

During stack assembly in the first embodiment, alternate ones of the plurality of axial segments 26 may be flipped in the axial direction to cancel the non-pole pass order forces, e.g., the $68^{th}$ order. When adjacent axial segments are alternately flipped (such as flipping the second and fourth axial segments 32, 36 but not the first axial and third segments 30, 34), the non pole-passing orders are reduced or eliminated while pole passing orders are not affected. Thus the first angular configuration 74 ($A_1$, $A_2$, $A_3$) and the fourth angular configuration 80 ($D_1$, $D_2$, $D_3$) are the same, that is, the respective angles are the same ($A_1=D_1, A_2=D_2, A_3=D_3$). Similarly, the second angular configuration 76 ($B_1$, $B_2$, $B_3$) and third angular configuration 78 ($C_1$, $C_2$, $C_3$) are the same. Referring to FIG. 1, the first pole A is directly adjacent in the axial direction X to the third pole C. As shown in FIG. 1, the second pole B is directly adjacent in the axial direction X to the fourth pole D.

Additionally, in the first embodiment, adjacent poles in each of the plurality of axial segments 26 may be placed at asymmetric angles, i.e., the rotor magnets 17 may be asymmetrically placed between north and south poles. Referring to FIG. 3, the first axial segment 30 exhibits pole-to-pole asymmetry such that the first angular configuration 74 ($A_1$, $A_2$, $A_3$) is different from the second angular configuration 76 ($B_1$, $B_2$, $B_3$). Referring to FIG. 4, the second axial segment 32 exhibits pole-to-pole asymmetry such that the third angular configuration 78 ($C_1$, $C_2$, $C_3$) is different from the fourth angular configuration 80 ($D_1$, $D_2$, $D_3$). Different magnet angles between north and south poles or pole-to-pole asymmetry serves to reduce torque ripple and pole pass order radial force, particularly the one with torque ripple order $72^{nd}$ for a rotor 12 with 8 poles and 72 stator slot geometry. Also, the $68^{th}$ order non-pole pass order is for a rotor 12 with an 8 pole and 72 stator slot combination.

The angular configurations may be characterized as "different" if the difference ($|A_i-B_i|$) in at least one of the three angles relative to the same angle in another angular configuration (i.e., angle $A_1$ is compared to the angle $B_1$ but angle $A_1$ is not compared to the angle $B_2$) is at or above a threshold. In one example, the threshold is 1% or more. Hence the first angular configuration 74 ($A_1$, $A_2$, $A_3$) is different from the second angular configuration 76 ($B_1$, $B_2$, $B_3$) if the difference between angles $A_3$ and $B_3$ is about 1% or more. In one example, the first angular configuration 74 ($A_1$, $A_2$, $A_3$) is (52, 50.5, 0.2) in degrees, and the second angular configuration 76 ($B_1$, $B_2$, $B_3$) is (52, 50.5, 3.75), in degrees. The threshold may be defined differently for each application.

The angular configurations may be characterized as "different" if the difference in at least two of the three angles relative to the same angle in another angular configuration is at or above the threshold. Hence the first angular configuration 74 ($A_1$, $A_2$, $A_3$) is different from the second angular configuration 76 ($B_1$, $B_2$, $B_3$) if the respective differences between angles $A_1$ and $B_1$, and angles $A_3$ and $B_3$ about 1% or more. In one example, the first angular configuration 74 ($A_1$, $A_2$, $A_3$) is (52, 48.7, 0.2) and the second angular configuration 76 ($B_1$, $B_2$, $B_3$) is (55, 48.7, 3.75), all in degrees. The angular configurations may be characterized as "different" if the respective differences in each of the three angles relative to the same angle in another angular configuration is at or above the threshold, i.e, if the respective differences between angles $A_1$ and $B_1$, angles $A_2$ and $B_2$ and angles $A_3$ and $B_3$ are each about 1% or more.

The angular configurations may be characterized as the "same" if the difference in each of the three angles relative to the same angle in another angular configuration (i.e., angle $A_1$ is compared to the angle $C_1$ but angle $A_1$ is not compared to the angle $C_2$) is within a tolerance factor. In one example, the tolerance factor is about 0.1% or less.

In summary, in the first embodiment, the plurality of axial segments 26 exhibit pole-to-pole asymmetry and are alternately flipped around the axial direction X in order to reduce or eliminate radial forces and torque ripple.

Second Embodiment

Figure 5:
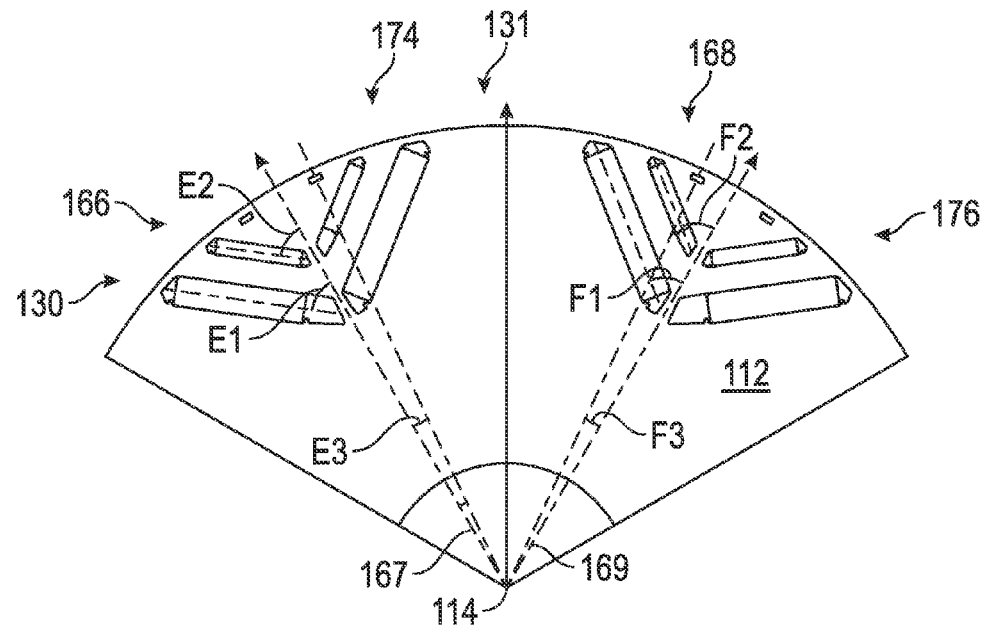
FIG. 5 is a schematic fragmentary cross-sectional view of the first axial segment, in accordance with a second embodiment.
Figure 6:
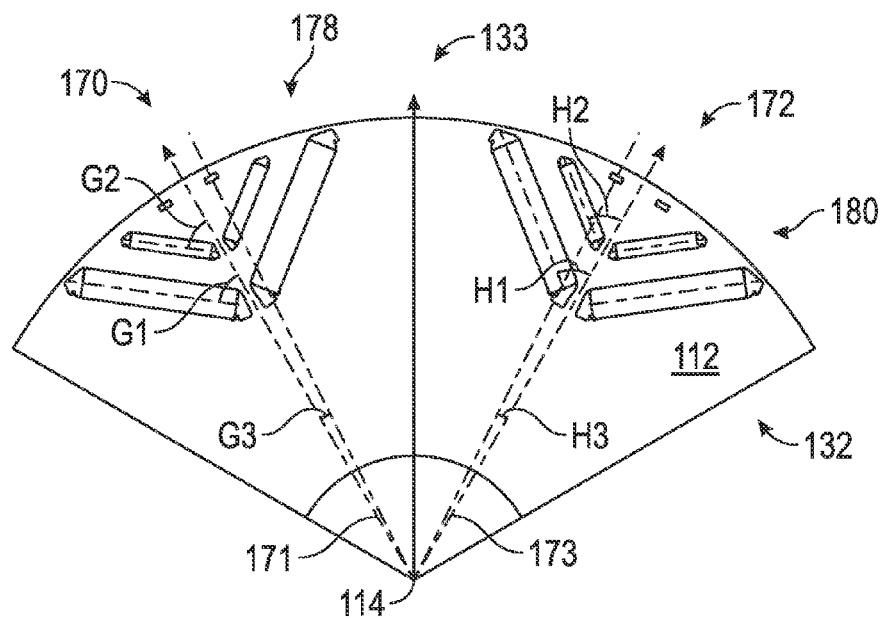
FIG. 6 is a schematic fragmentary cross-sectional view of a portion of the second axial segment, in accordance with the second embodiment.

Referring to FIGS. 5-6, a second embodiment illustrated by an interior permanent magnet machine including a rotor 112 with a central axis 114. A portion of a first axial segment 130 is shown in FIG. 5 and a portion of a second axial segment 132 is shown in FIG. 6. In both the first and second embodiments, the angular configuration, as characterized by the first, second and third angles (50, 56, 62), is different in two directly adjacent axial rotor segments. Referring to FIGS. 5-6, the first axial segment 130 defines a first set of angular configurations 131 and the second axial segment 132 defines a second set of angular configuration 133. The rotor 112 is configured to have an axially asymmetric configuration such that the first set of angular configurations 131 is different from the second set of angular configurations 133. However, in the second embodiment, there is pole-to-pole symmetry within individual axial segments 26, as described in detail below.

Referring to FIG. 5, the first axial segment 130 includes a first pole 166 (E) directly adjacent to a second pole 168 (F). Referring to FIG. 6, the second axial segment 132 includes a third pole 170 (G) directly adjacent to a fourth pole 172 (H). Each of the first, second, third and fourth poles 166, 168, 170, 172 defines respective first, second, third and fourth pole axes 167, 169, 171, 173, extending from the central axis 14 and half-way or mid-way through the respective poles. Each of the four poles 166, 168, 170, 172 (E-H) defines respective first, second, third and fourth angular configurations 174, 176, 178, 180 [($E_1$, $E_2$, $E_3$), ($F_1$, $F_2$, $F_3$), ($G_1$, $G_2$, $G_3$), ($H_1$, $H_2$, $H_3$)] represented by the respective first, second and third angles 50, 56, 62 that are described with reference to FIG. 2. The pattern represented by the first and second poles 166, 168 (E, F) may be repeated for the rest (not shown) of the first axial segment 130. The pattern represented by the third and fourth poles 170, 172 (G, H) may be repeated for the rest (not shown) of the second axial segment 132.

Referring to FIG. 5, the first axial segment 130 exhibits pole-to-pole symmetry such that the first angular configuration 174 ($E_1$, $E_2$, $E_3$) and the second angular configuration 176 ($F_1$, $F_2$, $F_3$) are about the same. Referring to FIG. 6, the second axial segment 132 exhibits pole-to-pole symmetry such that the third angular configuration 178 ($G_1$, $G_2$, $G_3$) and the fourth angular configuration 180 ($H_1$, $H_2$, $H_3$) are the same. Thus the respective slot sizes and shapes may be the same within individual axial segments 26.

Referring to FIGS. 5-6, the first angular configuration 174 ($E_1$, $E_2$, $E_3$) is different from the third angular configuration 178 ($G_1$, $G_2$, $G_3$) and fourth angular configuration 180 ($H_1$, $H_2$, $H_3$). The second angular configuration 176 ($F_1$, $F_2$, $F_3$) is different from both the third angular configuration 178 ($G_1$, $G_2$, $G_3$) and fourth angular configuration 180 ($H_1$, $H_2$, $H_3$).

In summary, non-pole pass orders are created when the north pole angular placement is different from the south pole angular placement. In the first embodiment, non-pole pass orders are canceled by flipping the rotor core segments axially. Torque ripple and pole-pass order radial forces are reduced due to different angular placement between north pole and south pole. In the second embodiment, the non-pole pass order would not be created since each of the axial segments 26 have the same north and south pole angular placement. But by changing the angles between different ones of the axial segments 26, the torque ripple and pole-pass order radial force are reduced. It is the combination of these features that allows reduction in both torque ripple and pole-pass order radial force. The first and second embodiments each reduce both torque ripple and pole-pass order radial force.

The first, second and third angles 50, 56, 62 described with reference to FIG. 2 may be optimized to obtain the desired level of averaging for the respective rotors 12 and 112 (shown in FIG. 5-6). This optimization may be performed empirically or through conventional computer modeling methods known in the art. In one example, the first angle 50 ranges from about 51.5 to 57 degrees, the second angle 56 ranges from about 48 to 53 degrees and the third angle 62 ranges from about 0 to 4.25 degrees.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. An interior permanent magnet machine comprising:
a rotor having a central axis and a plurality of axial segments such that each of the plurality of axial segments has at least one pole defining a respective angular configuration characterized by respective first, second and third angles;
wherein the plurality of axial segments include a first axial segment and a second axial segment positioned adjacent to each other in an axial direction;
wherein the first axial segment defines a first set of angular configurations and the second axial segment defines a second set of angular configurations;
wherein the rotor is configured to have an axially asymmetric configuration such that the first set of angular configurations is different from the second set of angular configurations;
wherein the at least one pole includes:
a pole axis extending from the central axis mid-way through the at least one pole;
a first pair of slots configured to be symmetric about the pole axis and arranged in a radially-inner first layer, the respective first angle being defined between the pole axis and a first centerline of one of the first pair of slots;
a second pair of slots configured to be symmetric about the pole axis and arranged in a radially-outer second layer, the respective second angle being defined between the pole axis and a second centerline of one of the second pair of slots; and
a pair of outer slots configured to be symmetric about the pole axis and formed near an outer surface of the rotor, the respective third angle being defined between the pole axis and a third centerline of one of the pair of outer slots;
wherein the first axial segment includes a first pole (A) directly adjacent to a second pole (B) and the second axial segment includes a third pole (C) directly adjacent to a fourth pole (D); and
wherein each of the first, second, third and fourth poles (A, B, C, D) defines respective first, second, third and fourth angular configurations [($A_1$, $A_2$, $A_3$), ($B_1$, $B_2$, $B_3$), ($C_1$, $C_2$, $C_3$), ($D_1$, $D_2$, $D_3$)] represented by the respective first, second and third angles.

2. The machine of claim 1, wherein:
adjacent ones of the plurality of axial segments are alternately flipped around the axial direction;
the first angular configuration ($A_1$, $A_2$, $A_3$) and the fourth angular configuration ($D_1$, $D_2$, $D_3$) are the same; and
the second angular configuration ($B_1$, $B_2$, $B_3$) and the third angular configuration ($C_1$, $C_2$, $C_3$) are the same.

3. The machine of claim 1, wherein:
the first axial segment exhibits pole-to-pole asymmetry such that the first angular configuration ($A_1$, $A_2$, $A_3$) is different from the second angular configuration ($B_1$, $B_2$, $B_3$); and
the second axial segment exhibits pole-to-pole asymmetry such that the third angular configuration ($C_1$, $C_2$, $C_3$) is different from the fourth angular configuration ($D_1$, $D_2$, $D_3$).

4. The machine of claim 3, wherein the first angular configuration ($A_1$, $A_2$, $A_3$) is different from the second angular configuration ($B_1$, $B_2$, $B_3$), when a difference between at least one of the respective first, second and third angles in the first angular configuration, relative to the second angular configuration, is at or above a threshold.

5. The machine of claim 3, wherein the first angular configuration ($A_1$, $A_2$, $A_3$) is different from the second angular configuration ($B_1$, $B_2$, $B_3$), when a respective difference between at least two of the respective first, second and third angles in the first angular configuration, relative to the second angular configuration, is at or above a threshold.

6. The machine of claim 3, wherein the first angular configuration ($A_1$, $A_2$, $A_3$) is different from the second angular configuration ($B_1$, $B_2$, $B_3$), when a respective difference between each of the respective first, second and third angles in the first angular configuration, relative to the second angular configuration, is at or above a threshold.

7. An interior permanent magnet machine comprising:
a rotor having a central axis and a plurality of axial segments, including a first axial segment and a second axial segment positioned adjacent to each other in an axial direction;

wherein each of the plurality of axially-spaced segments includes at least one pole having a pole axis and defining a respective angular configuration characterized by respective first, second and third angles;

wherein the first axial segment defines a first set of angular configurations and the second axial segment defines a second set of angular configurations;

wherein the rotor is configured to have an axially asymmetric configuration such that the first set of angular configurations is different from the second set of angular configurations;

wherein the respective first angle of the at least one pole is defined between the pole axis and a first centerline of one of a first pair of slots;

wherein the respective second angle of the at least one pole is defined between the pole axis and a second centerline of one of a second pair of slots;

wherein the respective third angle of the at least one pole is defined between the pole axis and a third centerline of one of a pair of outer slots;

wherein the first axial segment exhibits pole-to-pole asymmetry such that the first angular configuration ($A_1$, $A_2$, $A_3$) is different from the second angular configuration ($B_1$, $B_2$, $B_3$);

wherein the second axial segment exhibits pole-to-pole asymmetry such that the third angular configuration ($C_1$, $C_2$, $C_3$) is different from the fourth angular configuration ($D_1$, $D_2$, $D_3$);

wherein adjacent ones of the plurality of axial segments are alternately flipped around in the axial direction;

wherein the first angular configuration ($A_1$, $A_2$, $A_3$) and the fourth angular configuration ($D_1$, $D_2$, $D_3$) are the same; and wherein the second angular configuration ($B_1$, $B_2$, $B_3$) and the third angular configuration ($C_1$, $C_2$, $C_3$) are the same.

8. An interior permanent magnet machine comprising:

a rotor having a central axis and a plurality of axial segments, including a first axial segment and a second axial segment positioned adjacent to each other in an axial direction;

wherein each of the plurality of axially-spaced segments includes at least one pole defining a respective angular configuration characterized by respective first, second and third angles;

wherein the first axial segment defines a first set of angular configurations and the second axial segment defines a second set of angular configurations;

wherein the rotor is configured to have an axially asymmetric configuration such that the first set of angular configurations is different from the second set of angular configurations;

wherein the at least one pole includes a first pair of slots arranged in a radially-inner first layer, a second pair of slots arranged in a radially-outer second layer and a pair of outer slots formed near an outer surface of the rotor;

wherein the at least one pole includes a pole axis extending from the central axis mid-way through the at least one pole;

wherein the first pair of slots, the second pair of slots and the pair of outer slots are configured to be symmetric about the pole axis;

wherein the respective first angle of the at least one pole is defined between the pole axis and a first centerline of one of the first pair of slots;

wherein the respective second angle of the at least one pole is defined between the pole axis and a second centerline of one of the second pair of slots;

wherein the respective third angle of the at least one pole is defined between the pole axis and a third centerline of one of the pair of outer slots;

wherein the first axial segment includes a first pole (E) directly adjacent to a second pole (F) and second axial segment includes a third pole (G) directly adjacent to a fourth pole (H); and wherein each of the first, second, third and fourth poles (E, F, G, H) defines respective first, second, third and fourth angular configurations [($E_1$, $E_2$, $E_3$), ($F_1$, $F_2$, $F_3$), ($G_1$, $G_2$, $G_3$), ($H_1$, $H_2$, $H_3$)] represented by respective first, second and third angles.

9. The machine of claim 8, wherein:

the first axial segment exhibits pole-to-pole symmetry such that the first angular configuration ($E_1$, $E_2$, $E_3$) and the second angular configuration ($F_1$, $F_2$, $F_3$) are the same; and the second axial segment exhibits pole-to-pole symmetry such that the third angular configuration ($G_1$, $G_2$, $G_3$) and the fourth angular configuration ($H_1$, $H_2$, $H_3$) are the same.

10. The machine of claim 8, wherein the first and second axial rotor segments define different sets of angular configurations such that:

the first angular configuration ($E_1$, $E_2$, $E_3$) is different from each of the third angular configuration ($G_1$, $G_2$, $G_3$) and the fourth angular configuration ($H_1$, $H_2$, $H_3$); and the second angular configuration ($F_1$, $F_2$, $F_3$) is different from each of the third angular configuration ($G_1$, $G_2$, $G_3$) and the fourth angular configuration ($H_1$, $H_2$, $H_3$).

11. The machine of claim 10, wherein the first angular configuration ($E_1$, $E_2$, $E_3$) is different from the third angular configuration ($G_1$, $G_2$, $G_3$) when a difference between at least one of the respective first, second and third angles in the first angular configuration, relative to the third angular configuration, is at or above a threshold.

12. The machine of claim 10, wherein the first angular configuration ($E_1$, $E_2$, $E_3$) is different from the third angular configuration ($G_1$, $G_2$, $G_3$) when a respective difference between at least two of the respective first, second and third angles in the first angular configuration, relative to the third angular configuration, is at or above a threshold.

13. The machine of claim 10, wherein the first angular configuration ($E_1$, $E_2$, $E_3$) is different from the third angular configuration ($G_1$, $G_2$, $G_3$) when a respective difference between each of the respective first, second and third angles in the first angular configuration, relative to the third angular configuration, is at or above a threshold.

* * * * *